US008626652B2

(12) United States Patent
Chang et al.

(10) Patent No.: US 8,626,652 B2
(45) Date of Patent: *Jan. 7, 2014

(54) METHOD FOR ELECTRONIC TRANSACTION SETTLEMENT

(75) Inventors: Jerry Shaw-Yau Chang, Los Altos Hills, CA (US); Matthew Chiang, Claremont, CA (US); David Holmes-Kinsella, San Francisco, CA (US)

(73) Assignee: Advent IP LLC, Brooklyn, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/079,151

(22) Filed: Apr. 4, 2011

(65) Prior Publication Data

US 2011/0178923 A1 Jul. 21, 2011

Related U.S. Application Data

(60) Continuation of application No. 12/983,887, filed on Jan. 4, 2011, now Pat. No. 7,941,373, which is a division of application No. 09/851,553, filed on May 8, 2001, now Pat. No. 7,941,368.

(51) Int. Cl.
*G06Q 40/00* (2012.01)

(52) U.S. Cl.
USPC ............... 705/39; 705/35; 705/38; 705/40; 705/42

(58) Field of Classification Search
USPC .................................................. 705/35, 38
See application file for complete search history.

(56) References Cited

U.S. PATENT DOCUMENTS

| | | | | |
|---|---|---|---|---|
| 5,383,113 A | * | 1/1995 | Kight et al. | 705/40 |
| 5,465,206 A | * | 11/1995 | Hilt et al. | 705/40 |
| 5,575,474 A | * | 11/1996 | Rossides | 463/26 |
| 5,590,196 A | * | 12/1996 | Moreau | 705/78 |
| 5,671,279 A | * | 9/1997 | Elgamal | 705/79 |
| 5,749,785 A | * | 5/1998 | Rossides | 463/25 |
| 5,758,327 A | * | 5/1998 | Gardner et al. | 705/26.82 |
| 5,842,921 A | * | 12/1998 | Mindes et al. | 463/16 |
| 5,978,780 A | * | 11/1999 | Watson | 705/40 |
| 6,105,008 A | * | 8/2000 | Davis et al. | 705/41 |
| 6,126,543 A | * | 10/2000 | Friedman | 463/16 |
| 6,169,890 B1 | * | 1/2001 | Vatanen | 455/406 |
| 6,173,272 B1 | * | 1/2001 | Thomas et al. | 705/42 |
| 6,324,526 B1 | * | 11/2001 | D'Agostino | 705/44 |
| 6,327,578 B1 | * | 12/2001 | Linehan | 705/65 |
| 6,332,134 B1 | * | 12/2001 | Foster | 705/36 R |
| 6,347,307 B1 | * | 2/2002 | Sandhu et al. | 705/36 R |
| 6,601,040 B1 | * | 7/2003 | Kolls | 705/14.23 |
| 6,601,761 B1 | * | 8/2003 | Katis | 235/379 |
| 6,721,716 B1 | * | 4/2004 | Gross | 705/40 |
| 6,808,110 B1 | * | 10/2004 | Von Brockdorff | 235/380 |
| 6,839,684 B1 | * | 1/2005 | Rissanen et al. | 705/34 |
| 6,848,613 B2 | * | 2/2005 | Nielsen et al. | 235/379 |
| 6,904,136 B1 | * | 6/2005 | Cook | 379/114.25 |

(Continued)

Primary Examiner — Kirsten Apple

(57) ABSTRACT

A method implemented in an electronic communication system associated with a settlement house for settling an electronic transaction between a customer and a merchant. The communication system receives through a first electronic communication path a first account identifier of a first account associated with the customer and a transaction amount from the merchant, contacts the customer through a second electronic communication path to allow the customer to select a payment method, and sends through a third electronic communication path the transaction amount and a second account identifier of a second account associated with the customer to a financial services provider associated with the payment method.

18 Claims, 3 Drawing Sheets

(56) References Cited

U.S. PATENT DOCUMENTS

| | | | |
|---|---|---|---|
| 6,910,965 B2 * | 6/2005 | Downes | 463/28 |
| 6,932,268 B1 * | 8/2005 | McCoy et al. | 235/380 |
| 6,934,689 B1 * | 8/2005 | Ritter et al. | 705/17 |
| 6,988,657 B1 * | 1/2006 | Singer et al. | 235/380 |
| 6,996,542 B1 * | 2/2006 | Landry | 705/40 |
| 7,941,368 B2 * | 5/2011 | Chang et al. | 705/39 |
| 7,941,373 B1 * | 5/2011 | Chang et al. | 705/39 |

\* cited by examiner

METHOD FOR ELECTRONIC TRANSACTION SETTLEMENT

CROSS REFERENCE TO RELATED APPLICATIONS

This application is a continuation application of U.S. patent application Ser. No. 12/983,887, filed Jan. 4, 2011 now U.S. Pat. No. 7,941,373, entitled, "System for electronic transaction settlement", which is a divisional application of U.S. patent application Ser. No. 09/851,553, filed May 8, 2001 now U.S. Pat. No. 7,941,368, entitled, "System and method for electronic transaction settlement", both aforementioned applications of which are incorporated herein by reference in their entirety.

FIELD OF THE INVENTION

This invention relates generally to electronic transactions and more particularly to electronic transaction settlement.

BACKGROUND

Customers are increasingly using electronic means to purchase goods and services. To complete a credit card transaction, merchants typically no longer make a physical imprint of the card. Instead, a magnetic strip on the card is read by a computer to access the customer's credit card number and expiration date. Many people now also use debit cards to pay for goods and services, where the transaction amount is deducted from a bank account. Some transactions are carried out where the merchant has no physical contact with the credit card. For example, when ordering goods or services via a merchant's Internet website, a customer typically enters a credit card type, number, and expiration date into fields of a web form.

Enjoyment of some goods and services still requires the physical presence of the customer, for example dining at a restaurant. In such a situation, if customers wish to use a credit or debit card, then they must have that card upon their person. For this reason, many people habitually carry multiple cards with them at all times. This increases the chances of one or more of the cards being lost or stolen.

Also, in a restaurant situation, a credit or debit card may be out of the customer's possession for a length of time, when one or more persons may have an opportunity to copy the card number and expiration date. It is a significant concern of customers to be able to enjoy the convenience of using credit and debit cards while minimizing the risk of unauthorized access to their card numbers.

SUMMARY OF THE INVENTION

The method for electronic transaction settlement includes a customer providing an account identifier and contact information to a merchant, the merchant contacting a settlement house and transmitting the account identifier and a transaction amount, the settlement house contacting the customer, preferably via a mobile communication device such as a mobile telephone or a handheld computing device.

The customer then selects a payment method, such as a credit card or debit card. The customer may have several options to choose from. The customer's communication device transmits the selection to the settlement house. The settlement house contacts a credit provider or the customer's bank for authorization. If the settlement house receives an authorization, the settlement house transmits it to the client, who then typically approves the amount.

The settlement house then completes the transaction with the credit provider or customer's bank and the merchant's bank. If the customer selected a credit card, the credit provider adds a charge in the transaction amount to the customer's account. If the customer selected a debit card, the customer's bank deducts the transaction amount from the customer's bank account. The merchant's bank credits the merchant's account with the transaction amount.

DETAILED DESCRIPTION

Figure 1:
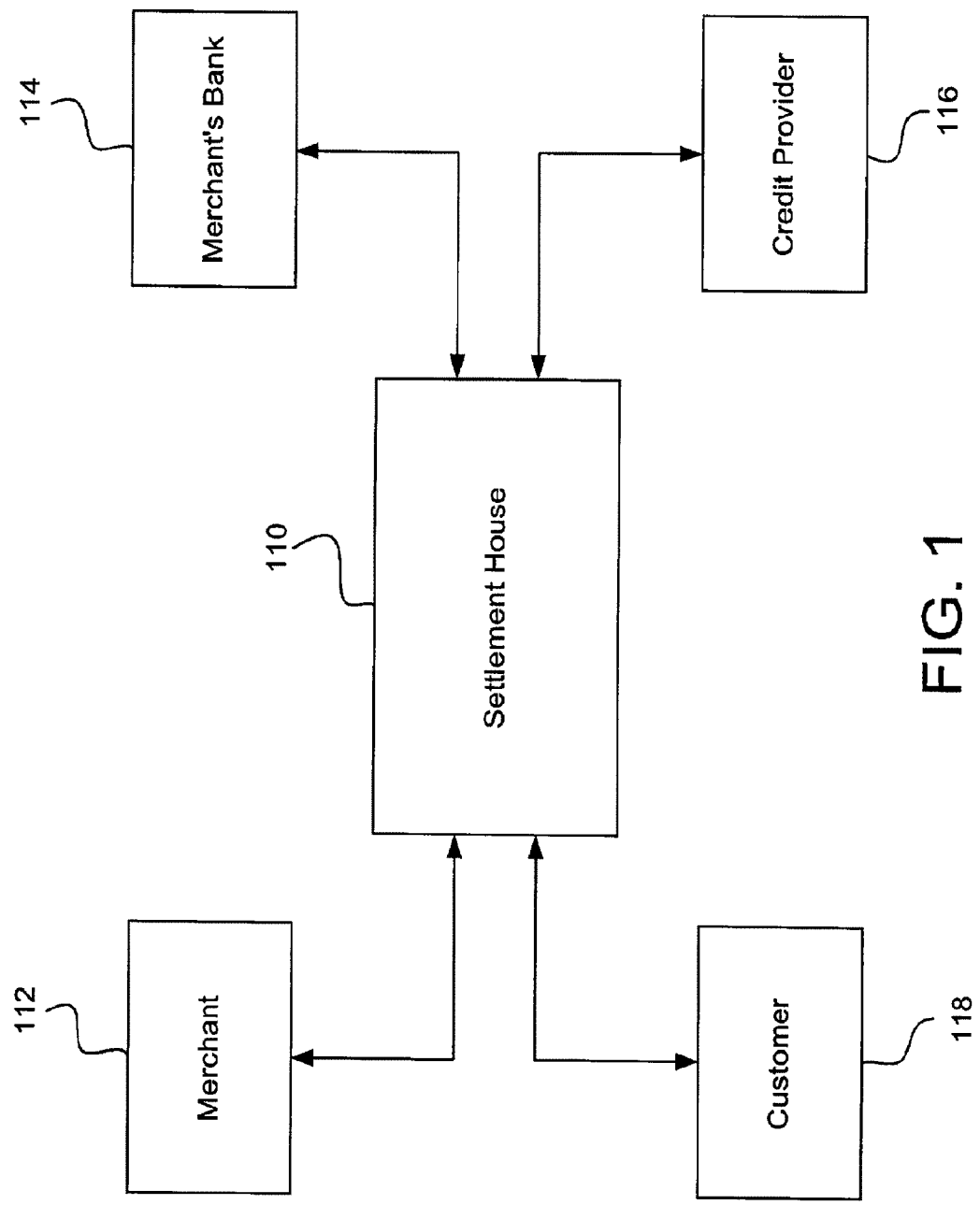
FIG. 1 is a block diagram of one embodiment of an electronic transaction settlement system, in accordance with the invention.

FIG. 1 shows an electronic transaction settlement system including, but not limited to, a settlement house 110, a merchant 112, a merchant's bank 114, a credit provider 116, and a customer 118. Merchant 112 may be a retail store, restaurant, wholesaler, or any other type of provider of goods or services. Merchant's bank 114 may be any type of financial service provider where merchant 112 maintains an active account. Credit provider 116 is a financial service provider that provides a line of credit to customer 118. For example, credit provider 116 may have issued a credit card to customer 118. Customer 118 is preferably an individual consumer, but may also be a representative of a business or non-profit organization.

Settlement house 110 is preferably an entity independent of merchant 112, merchant's bank 114, credit provider 116, and customer 118; however, in some embodiments settlement house 110 may be affiliated with one or more of the other parties. For example, settlement house 110 may include credit provider 116. Settlement house 110 preferably has communication paths to merchant 112, merchant's bank 114, and credit provider 116. The communication paths may include an Internet connection, a PSTN connection, a Local Area Network (LAN) connection, a Wide Area Network (WAN) connection, a wireless network connection, or a combination of the above.

Customer 118 preferably communicates, at least in part, via a wireless communication path with settlement house 110. Customer 118 may use any type of mobile communication device, including but not limited to a mobile telephone, a pager, and a handheld computing device such as a personal digital assistant (PDA). Customer 118 may use any type of interface to communicate with settlement house 110, including key strokes, voice commands, or a touchscreen.

Settlement house 110 manages settlement of transactions between merchant 112, merchant's bank 114, credit provider 116, and customer 118. For instance, a purchase by customer 1118 from merchant 112 may include a transaction between customer 118 and credit provider 116, a transaction between credit provider 116 and merchant's bank 114, and a transaction between merchant 112 and merchant's bank 114.

Customer 118 preferably maintains an account with settlement house 110. The account may contain information regarding several options for payment, including a bank debit card and one or more credit cards.

To initiate a purchase, customer 118 provides contact information of settlement house 110 to merchant 112. Customer 118 also provides account information, such as a name or account number, to merchant 112. Merchant 112 uses the contact information to initiate communications with settlement house 110. Merchant 112 then transmits the account information for customer 118 and the purchase amount. Settlement house 110 then completes the transaction so that credit provider 116 adds a charge to the credit account of customer 118 and merchant's bank 114 records a payment into the account of merchant 112. Further details of a transaction settlement are discussed below in conjunction with FIG. 3.

Throughout the purchase transaction, merchant 112 does not have access to the credit account number of customer 118, which provides privacy to customer 118. If credit provider 116 denies the transaction, customer 118 may then select a credit account with another credit provider (not shown). Customer 118 is thus spared any embarrassment due to a denial of a credit transaction.

Figure 2:
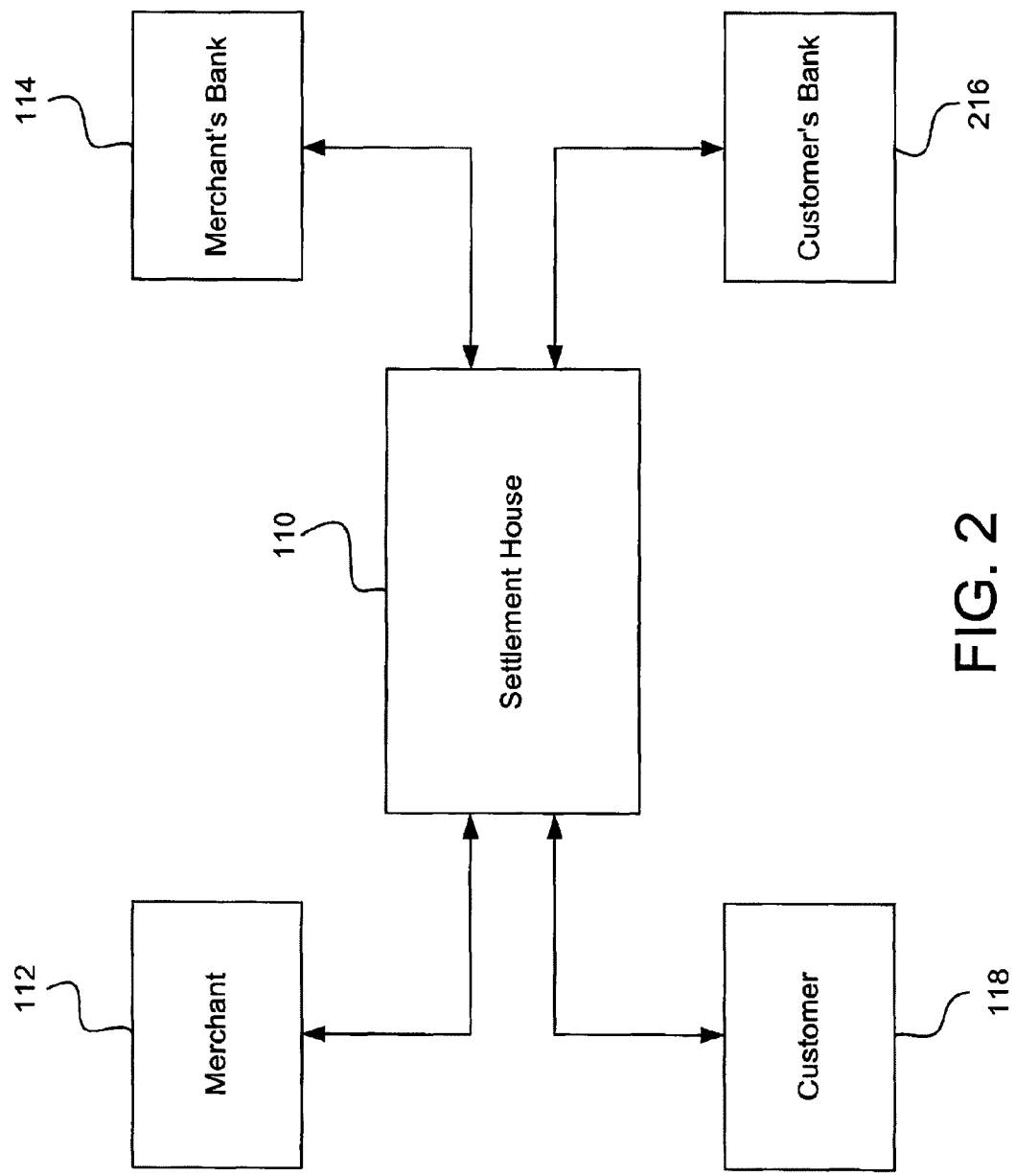
FIG. 2 is a block diagram of a further embodiment of an electronic transaction settlement system, in accordance with the invention.

FIG. 2 shows an electronic transaction settlement system including, but not limited to, settlement house 110, merchant 112, merchant's bank 114, a customer's bank 216, and customer 118. Customer 118 maintains an account with customer's bank 216. The account may be a checking account, a savings account, or any other type of bank account. Customer 118 preferably has a debit card with an associated debit card number that allows him or her to pay for purchases with monies from the account with customer's bank 216.

In the FIG. 2 embodiment, settlement house 110 uses the debit card number to settle transactions with customer's bank 216. Customer 118 provides contact information and a name or account information to merchant 112. Merchant 112 contacts settlement house 110 and transmits the name or account information and the amount of the transactions. Settlement house 110 then contacts customer 118 via a mobile telephone or other communication device. Customer 118 selects a payment method, in this embodiment the debit card. Settlement house 110 then contacts customer's bank 216 to request payment for the amount of the transaction.

Although not shown if FIG. 2, customer 118 may also select additional payment methods. Customer 118 may have an account with a financial service provider that may or may not be a bank or credit provider and may select to pay using that account. For example, if customer 118 is a teenager, a parent may deposit an amount of money with a financial service provider who establishes an account accessible by the teenager. Thus the parent may provide spending money to the teenager without using cash.

Figure 3:
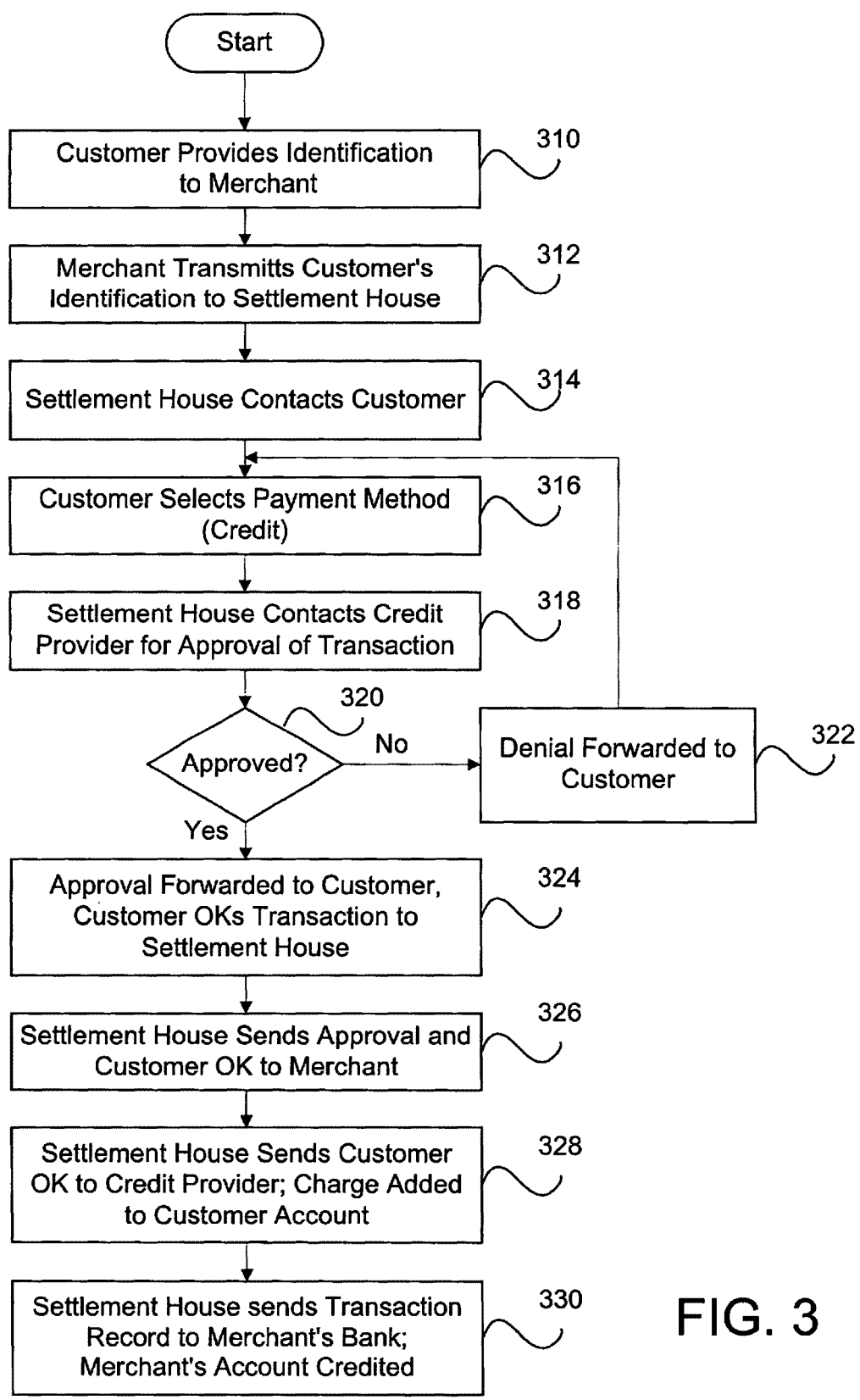
FIG. 3 is a flowchart of method steps for settling electronic transactions, in accordance with one embodiment of the invention.

FIG. 3 is a flowchart of method steps for settling electronic transactions, according to one embodiment of the invention. First, in step 310, customer 118 provides identification to merchant 112. The identification may include the customer name, an account name or number, or any other type of identification. Customer 118 may also provide contact information for settlement house 110. Next, in step 312, merchant 112 transmits the identification of customer 118 to settlement house 110.

In step 314, settlement house 110 contacts customer 118. Settlement house 110, may place a call to a mobile telephone of customer 118, or contact customer 118 via any other type of mobile communication device. Then, in step 316, customer 118 selects a payment method, for example a credit card, and this selection is transmitted to settlement house 110. Customer 118 may have the option of choosing among several credit cards or debit cards, depending on his or her arrangement with settlement house 110.

In step 318, settlement house 110 contacts credit provider 116 for approval of the transaction. Settlement house 110 then transmits the account information, for example the credit card number, and the amount of the transaction. In step 320, credit provider 116 approves or denies the transaction. If credit provider 116 denies the transaction, then in step 322 settlement house 110 forwards the denial to customer 118. The method returns to step 316, where customer 118 may select an alternate payment method.

If credit provider 116 approves the transaction, then in step 324 settlement house 110 forwards the approval to customer 118, and customer 118 approves (OKs) the transaction to settlement house 110. Customer approval may include an additional amount to add to the transaction, for example when using a debit card and requesting cash. In step 326, settlement house 110 sends the approval of customer 118 to credit provider 116, which then adds a charge in the transaction amount to the account of customer 118. In step 328, settlement house 110 sends a transaction record to merchant's bank 114, which the credits the account of merchant 112 with the transaction amount.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A method implemented in an electronic communication system associated with a settlement house for settling an electronic transaction between a customer and a merchant, the method comprising:
   receiving in the system from the merchant through a first electronic communication path a first account identifier of a first account associated with the customer and a transaction amount;
   contacting in the system the customer through a second electronic communication path;
   receiving the customer's selection of a payment method; and
   sending in the system through a third electronic communication path the transaction amount and a second account identifier of a second account associated with the payment method to a financial services provider associated with the payment method.

2. The method of claim 1 further comprising:
   transmitting in the system an approval response from the financial services provider to the customer; and
   transmitting in the system customer approval from the customer to the financial services provider.

3. The method of claim 2 further comprising:
   sending in the system a transaction record to a bank associated with the merchant.

4. The method of claim 1, wherein the second account identifier is one of a credit card number and a debit card number.

5. The method of claim 1, wherein the financial service provider is a bank.

6. The method of claim 1, wherein the financial services provider is not a bank or credit provider.

7. A method implemented in an electronic communication system associated with a settlement house for settling an electronic transaction between a customer and a merchant, the method comprising:
    receiving in the system from the merchant through a first electronic communication path a first account identifier of a first account associated with the customer at the settlement house and a transaction amount;
    contacting in the system the customer through a second electronic communication path to allow the customer to select a first payment method;
    sending in the system through a third electronic communication path the transaction amount and a second account identifier of a second account associated with the first payment method to a first financial services provider associated with the first payment method;
    transmitting in the system a denial response from the first financial services provider to the customer;
    receiving in the system from the customer the selection of a second payment method; and
    sending in the system the transaction amount and a third account identifier of a third account associated with the second payment method to a second financial services provider associated with the second payment method.

8. The method of claim 7 further comprising:
    transmitting in the system an approval response from the second financial services provider to the customer; and
    transmitting in the system a customer approval from the customer to the second financial services provider.

9. The method of claim 8 further comprising:
    sending in the system a transaction record to a bank associated with the merchant.

10. The method of claim 7, wherein the second account identifier is one of a credit card number and a debit card number.

11. The method of claim 7, wherein the first financial services provider is a bank.

12. The method of claim 1, wherein the first financial services provider is not a bank or credit provider.

13. A method implemented in an electronic communication system associated with a settlement house for settling an electronic transaction between a customer and a merchant, the method comprising:
    receiving in the system from the merchant through a first electronic communication path a first account identifier of a first account associated with the customer at the settlement house and a transaction amount;
    sending in the system through a second electronic communication path the transaction amount and a second account identifier of a second account associated with the customer to a financial services provider associated with the second account; and
    receiving in the system through a third electronic communication path an approval of the customer of the electronic transaction.

14. The method of claim 13 further comprising:
    transmitting in the system an approval response from the financial services provider to the customer.

15. The method of claim 14 further comprising:
    sending in the system a transaction record to a bank associated with the merchant.

16. The method of claim 13, wherein the second account identifier is one of a credit card number and a debit card number.

17. The method of claim 13, wherein the financial services provider is a bank.

18. The method of claim 13, wherein the financial services provider is not a bank or credit provider.

* * * * *